United States Patent [19]

Olson

[11] Patent Number: 4,787,051

[45] Date of Patent: Nov. 22, 1988

[54] INERTIAL MOUSE SYSTEM

[75] Inventor: Lynn T. Olson, Portland, Oreg.

[73] Assignee: Tektronix, Inc., Beaverton, Oreg.

[21] Appl. No.: 864,053

[22] Filed: May 16, 1986

[51] Int. Cl.$^4$ .............................................. G09G 1/00
[52] U.S. Cl. .................................. 364/518; 340/710; 378/18
[58] Field of Search ............... 364/518, 444, 449, 453; 340/707–710; 178/18–20

[56] References Cited

U.S. PATENT DOCUMENTS

| | | | |
|---|---|---|---|
| 4,173,785 | 11/1979 | Licata | 364/453 |
| 4,603,231 | 7/1986 | Reiffel et al. | 178/19 |
| 4,654,648 | 3/1987 | Herrington et al. | 340/710 |
| 4,679,159 | 7/1987 | Yamazaki et al. | 178/18 X |
| 4,695,831 | 9/1987 | Shinn | 178/18 X |

Primary Examiner—Gary V. Harkcom
Assistant Examiner—H. R. Herndon
Attorney, Agent, or Firm—Daniel J. Bedell; Robert S. Hulse

[57] ABSTRACT

A hand-held inertial mouse provides input data to a computer from which the computer can determine the translational and angular displacement of the mouse. The mouse includes accelerometers for producing output signals of magnitudes proportional to the translational acceleration of the mouse in three non-parallel directions. Pairs of these accelerometers are positioned to detect acceleration along each axis of a cartesian coordinate system such that an angular acceleration of the mouse about any axis of rotation causes representative differences in the magnitudes of the output signals of one or more of these accelerometer pairs. The translational velocity and displacement of the mouse is determined by integrating the accelerometer output signals and the angular velocity and displacement of the mouse is determined by integrating the difference between the output signals of the accelerometer pairs.

11 Claims, 4 Drawing Sheets

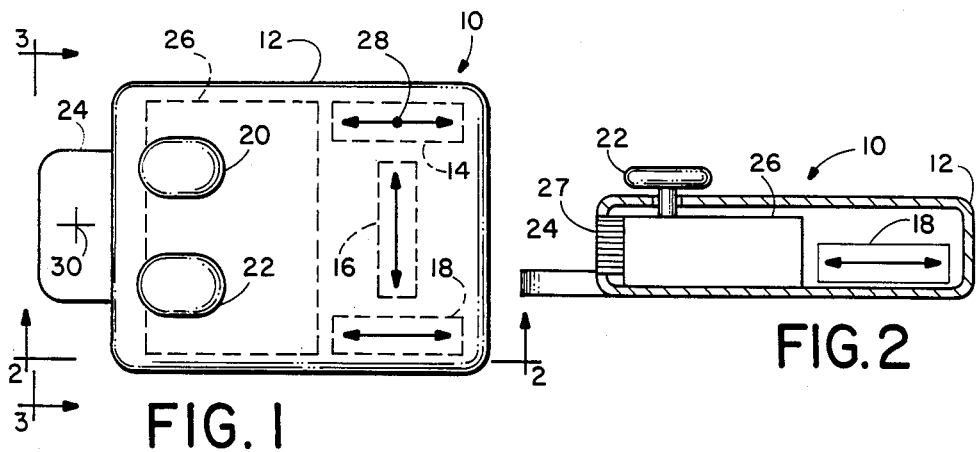
FIG. 1
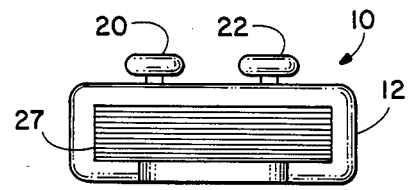
FIG. 2
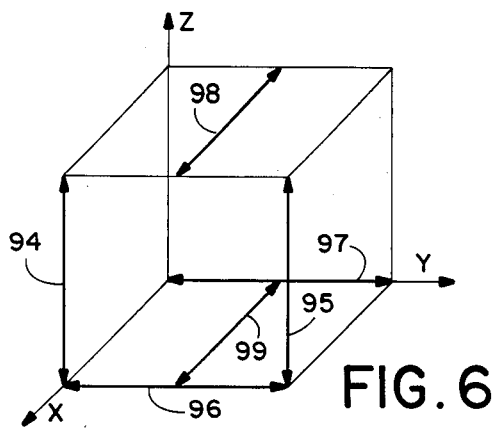
FIG. 3
FIG. 6

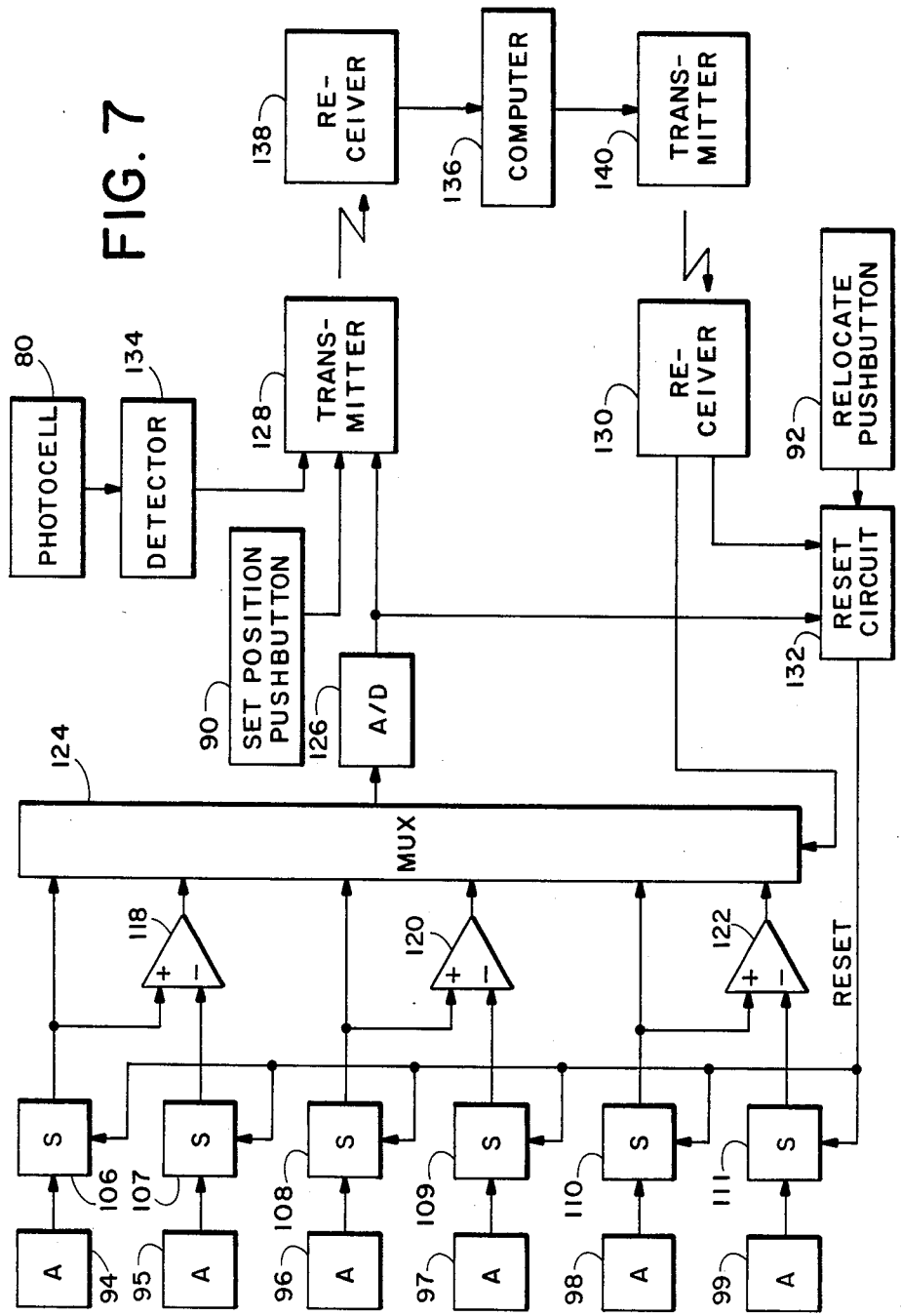

INERTIAL MOUSE SYSTEM

BACKGROUND OF THE INVENTION

The present invention relates in general to computer input devices and in particular to a method and apparatus for inputting spatial coordinate data to a computer.

The advent of interactive computer graphics systems has spurred the development of a variety of devices for enabling a user to easily input spatial coordinate data into a computer. For instance to define a straight line to be drawn on a screen by a computer, one can use a keyboard to input to a graphics computer the endpoint coordinates of the line with reference to a coordinate system known to the computer. However this method is slow and difficult to use and more recently developed interactive computer graphics systems include some means such as a "mouse", "joystick", or digitizing tablet for permitting a user to move a cursor displayed on a screen and to indicate screen coordinates by depressing a button when the cursor is in the desired screen location.

A typical "mouse" comprises a chassis containing a ball, with a part of the ball protruding through the underside of the chassis. When an operator moves the mouse about on a flat surface, the ball rotates. Sensors in the chassis detect the rotation of the ball about two perpendicular, horizontal axes and a computer can determine the displacement of the center of the ball from a reference point in two-dimensional space from the sensor outputs, the displacement therefore representing a two-dimensional spatial coordinate. Unfortunately the moving parts of such a mouse can become dirty, causing the sensors to incorrectly measure ball rotation. In addition, a mouse requires the use of a relatively large, flat surface on which the ball can roll easily without skipping and such a flat space with a suitable, non-slip surface is not always available near a computer terminal.

A mouse having a cross-hair sighting extension can be used to digitize line drawings, the computer monitoring the coordinates of the mouse as an operator moves the mouse over each line on the drawing while maintaining the cross-hair sight over the line. However such an apparatus is subject to error when the mouse chassis is inadvertently rotated about a vertical axis during a tracing operation since a chassis rotation in any amount causes the cross-hair to move more or less than the center of the ball. For instance when center of the ball is held fixed over a point on a drawing but the cross-hair is rotated about the ball to follow a curved line, the mouse will not indicate any movement at all.

A typical "optical" mouse operates on a pad having a reflective grid on its surface. A light emitting diode on the mouse shines a light beam on the pad which is reflected back to a light sensor on the mouse as the light passes over a grid line, enabling the mouse to detect movement. This type of mouse has no moving parts but the grid lines can wear off in time. An optical mouse cannot be used to trace a line drawing because paper between the mouse and the pad interferes with mouse operation.

Graphics tablets employ a pad with a fine grid of wires periodically conducting electrical pulses. The operator moves a stylus about on the pad, the stylus having a sensor for detecting the pulses, and the position of the stylus on the tablet is determined by the timing of the pulses detected. Graphics tablets don't have moving parts subject to wear or dirt and can digitize drawings without error due to rotation of the stylus. However graphics tablets are relatively expensive.

"Three-dimensional" computer graphics systems have recently been developed. One such system utilizes an electronic polarizing shutter placed over a conventional cathode ray tube (CRT) display screen, the shutter being adapted to polarize the light from the screen in either of two mutually perpendicular directions depending on the state of an externally generated control signal. Two-dimensional views of a three-dimensional image to be displayed are stored in memory, each view being drawn from a slightly different angle. These views are alternately displayed on the screen and the shutter control signal state is synchronized with the rapidly alternating display so that the two images are polarized in different directions. A viewer wearing polarized glasses, with right lens polarized to block one of the images and left lens polarized to block the other image, sees slightly different views of the three-dimensional object in each eye, and these two views give the viewer a realistic visual impression of a three-dimensional object.

The use of this type of three-dimensional graphics display in an interactive graphics system has been limited in part because of the lack of a practical input device enabling a user to easily control the movement of a cursor within the three-dimensional display. Mechanical and optical mice, graphics tablets, joysticks and the like are capable of providing only two-dimensional displacement or spatial coordinate information to a computer. What is needed, and would be useful is a device which can enable a user to input two or three-dimensional spatial coordinate data to a computer and which has no moving parts subject to wear.

SUMMARY OF THE INVENTION

In accordance with one aspect of the invention, in one embodiment thereof, a hand-held input device (hereinafter referred to as an "inertial mouse") for a computer includes accelerometers for producing output signals of magnitudes proportional to its acceleration in two non-parallel directions forming a two-dimensional cartesian coordinate system. The output signal of each accelerometer is integrated to provide data from which the computer can determine the movement of the inertial mouse in two-dimensional space. The inertial mouse uses no moving parts, is not subject to wear or errors due to dirt accumulation, and does not require the use of any special surface or pad since it can function in free space.

In accordance with another aspect of the invention, an alternative "three-dimensional" embodiment of the inertial mouse is provided with accelerometers positioned for detecting accelerations in three directions forming a three-dimensional coordinate system. The outputs of the three accelerometers are integrated to produce data from which the computer can determine the movement of the mouse in three-dimensional space. The three-dimensional embodiment of the inertial mouse is useful, for instance, in digitizing the coordinates of points on three-dimensional objects.

In accordance with a further aspect of the invention, the inertial mouse includes accelerometer pairs positioned such that an angular (rotational) acceleration of the inertial mouse causes representative differences in the magnitudes of the output signals of the two accelerometers of each pair so that the computer can determine the angular displacement of the mouse as well as its translational displacement. In the two-dimensional embodiment of the mouse, one accelerometer pair is positioned such that both accelerometers detect accelerations in the same horizontal direction. Any difference in outputs of between the two accelerometers is proportional to the rotational acceleration of the mouse about a vertical axis. This difference is integrated to provide data from which the computer can determine the rotational displacement of the mouse. This aspect of the invention is particularly useful when the mouse is used for digitizing two-dimensional contours because it enables the computer to correct the apparent position of a point on the mouse (such as a cross-hair sight extension on the mouse) to account for any rotation of the mouse during the digitizing process.

In the three-dimensional embodiment of the inertial mouse, three pairs of parallel oriented accelerometers are positioned to detect angular accelerations about three axes, the axes forming a three-dimensional cartesian coordinate system such that an angular acceleration of the mouse about any axis of rotation causes representative differences in the magnitudes of the output signals of one or more of these accelerometer pairs. The differences are integrated to provide three sets of data from which the computer can determine the angular displacement of the mouse in three-dimensional space. This aspect of the invention is useful, for instance, when the mouse is utilized to digitize a three-dimensional object since it enables the computer to correct the apparent position of a pointer on the mouse for any rotation of the mouse during the digitizing process.

In accordance with a further aspect of the invention, the inertial mouse includes a user operable pushbutton switch for grounding the output signals of integrators integrating the output signals of the accelerometers to enable the user to reposition the mouse in space without causing any change to data provided to the computer.

In accordance with a still further aspect of the invention, the three-dimensional embodiment of the inertial mouse includes a pointer tip containing a light sensor. When the pointer tip is placed on a cathode ray tube screen of a three-dimensional display system, the light sensor senses when the electron beam of the cathode ray tube strikes the screen phosphors under the pointer tip and the mouse transmits an indicating signal back to a computer. The computer determines the position of the pointer tip on the screen according to the timing of the indicating signal. The combination of the three-dimensional inertial mouse and the light sensor enables the computer to determine the actual position of the mouse pointer tip within its own three-dimensional coordinate system. This feature of the invention permits the computer, for instance, to synchronize the pointer and the apparent position of a displayed cursor in three-dimensional space with the position of the mouse pointer tip, thereby enabling a user to directly move the cursor with the mouse, thereby enabling a user, for instance, to directly draw a three-dimensional object with the mouse, given suitable three-dimensional graphics software.

It is accordingly an object of the invention to provide a new and improved apparatus for providing input to a computer from which the computer can determine spatial coordinates.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 1 is a plan view of a preferred embodiment of an inertial mouse according to the present invention;

FIG. 2 is an elevation view taken at section A—A of the inertial mouse of FIG. 1;

FIG. 3 is an elevation view taken at section B—B of the inertial mouse of FIG. 1;

FIG. 6 is an illustration of the orientation of the accelerometers of the inertial mouse of FIG. 5; and FIG. 7 is a block diagram of signal processing circuits utilized within the inertial mouse of FIG. 5.

DETAILED DESCRIPTION

Figure 4:
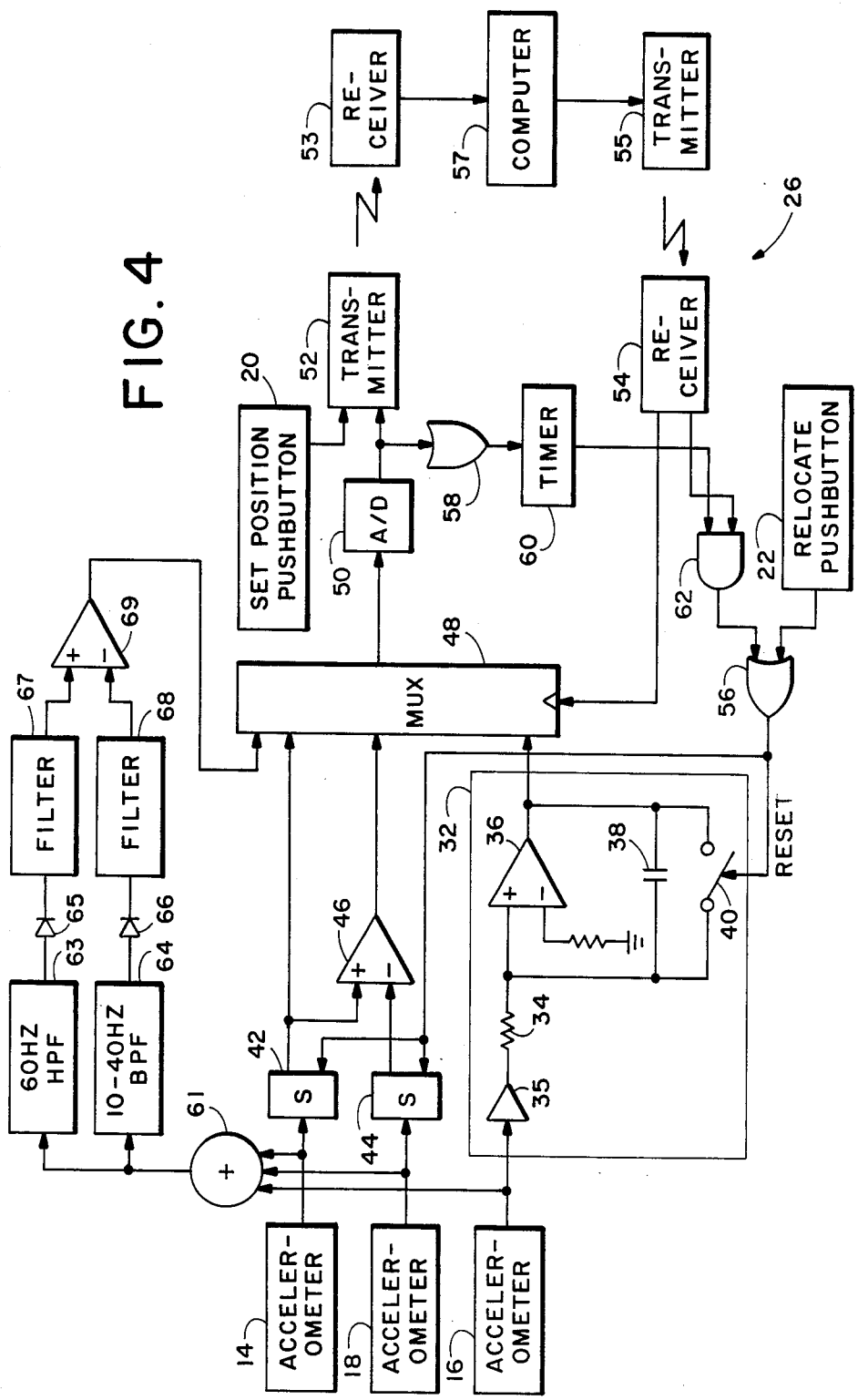
FIG. 4 is a combination block and schematic diagram of signal processing circuits mounted within the inertial mouse of FIG. 1.

Referring to FIG. 1 there is depicted a plan view of an inertial mouse 10 according to a preferred embodiment of the present invention, adapted to provide data from which a computer can ascertain the position of the mouse as it moves in two-dimensional space. The mouse 10 may be used, for example, by an operator to change the position of a cursor on a computer controlled display screen by changing the horizontal position of the mouse, the computer being programmed to change the position of the cursor in proportion to the change in position of the mouse. FIG. 2 is an elevational view (section A—A), and FIG. 3 is an elevational view (section B—B) of the mouse 10 of FIG. 1. The mouse 10 includes a chassis 12, a set of accelerometers 14, 16 and 18 mounted inside the chassis, a pair of pushbutton switches 20 and 22 mounted on top of the chassis, a cross-hair sight 24 extending outward from the front of the chassis, and electronic signal processing, transmitting and receiving circuitry 26, also mounted inside the chassis. A front portion of chassis 12 includes a translucent section 27 through which the mouse 10 transmits and receives infrared signals conveying information to and from a remote computer.

Each accelerometer 14, 16 and 18 generates an output signal of magnitude proportional to the acceleration (or deceleration) of mouse 10 in a particular direction as indicated by the double ended arrows on the accelerometers of FIG. 1. Accelerometers 14, 16 and 18 are all positioned to detect horizontal accelerations of the mouse 10, with accelerometers 14 and 18 detecting when the mouse is accelerated in a forward or rearward direction and with accelerometer 16 detecting lateral accelerations of the mouse. The displacement of an object in space during a given time period can be determined by twice integrating a function describing the magnitude and direction of its acceleration during the time period. Accordingly, the forward or rearward displacement of the mouse 10 from a reference starting point during any time period is determined by twice integrating the output signal of either accelerometer 14 or 18 and the lateral displacement of mouse 10 is determined by twice integrating the output of accelerometer 16. The angular displacement of an object about an axis during a given time period can be determined by twice integrating a function describing its angular acceleration about the axis. The difference between the magnitudes of the output signals of accelerometers 14 and 18 is proportional to the angular acceleration of mouse 10 about a vertical axis through a point 28 on accelerometer 14, and the angular displacement of mouse 10 about this axis is therefore proportional to the second integral of this magnitude difference.

Thus the translational displacement in a horizontal plane of mouse 10, and in particular of a point 28 on mouse 10, is determined by twice integrating the outputs of accelerometers 14 and 16, and the angular displacement of the mouse about a vertical axis through point 28 can be determined by twice integrating the difference between the output signals of accelerometers 14 and 18. Once the translational and angular displacement of point 28 is known, the displacement of any other point on mouse 10 during any time period can be easily determined from the amount of translational displacement of point 28 and from the direction and angle of rotation of the other point about point 28.

One such point of interest on mouse 10 is the center point of a cross-hair 30 on cross-hair site 24. Site 24 is a clear plastic extension on the front of mouse 10 and cross-hair 30 is etched on the plastic extension. The mouse 10 may be used to digitize a line drawing mounted on a flat, horizontal surface. For example to digitize a straight line on a drawing, the mouse 10 is placed on the drawing with an end point of the line directly under the center of cross-hair 30. When pushbutton 20 is depressed, mouse 10 sends an indicating signal to the computer which monitors the angular and translational displacement of the mouse. On receipt of the indicating signal, the computer notes the position of the cross-hair center as the position of one end of the line. The mouse is then relocated so that the cross-hair center is directly over the opposite end of the line on the drawing and pushbutton 20 is depressed once again, sending the indicating signal once more to the computer. The computer then notes the new position of the cross-hair center as the position of the other end of the line. An operator may also use the mouse to digitize a curved line by continuously holding down the pushbutton 20 while tracing out the line with the cross-hair. This causes a suitably programmed computer to continuously note the position of the cross-hair as it moves over the line.

If the mouse 10 is not rotated as it moves between the two end points on the line, then the outputs of accelerometers 14 and 16 can be integrated twice and combined as a vector sum to accurately describe the line in terms of a displacement between the two line endpoints. However if the mouse 10 is rotated as it moves from endpoint to endpoint, as will often happen when the mouse is moved by a human user, this vector sum will not accurately reflect the actual displacement of the center of cross point 30 because accelerometers 14 and 16 will not move the same distance or direction as the cross-hair center. Since the additional accelerometer 18 enables the rotation of mouse 10 to be determined by twice integrating the difference in outputs between accelerometers 14 and 18, the vector sum derived from the outputs of accelerometers 14 and 16 may be corrected according to the amount of mouse rotation to more accurately reflect the actual displacement of the center of cross-hair 30.

FIG. 4 is a combination block and schematic diagram of the signal processing, transmitting and receiving circuitry 26 of mouse 10 of FIG. 1. The output of accelerometer 16 is integrated by an integrator 32 including a preamplifier 35 for amplifying the output of the accelerometer, a resistor 34 connecting the output of preamplifier 35 to an inverting input of an operational amplifier 36 and a capacitor 38 coupling the output of amplifier 36 to its inverting input. A noninverting input of amplifier 36 is grounded. The integrator 32 also includes an electronic switch 40 for shunting capacitor 38 on receipt of an externally generated reset control signal. The magnitude of the output of integrator 32 is proportional to the integral of the accelerometer 16 output voltage when switch 40 is open but is zero when switch 40 is closed. The output signals of accelerometers 14 and 18 are integrated by integrators 42 and 44, respectively, which are similar to integrator 32. The output of integrator 42 is connected to a non-inverting input of a difference amplifier 46 while the output of integrator 44 is connected to an inverting input of amplifier 46. The outputs of integrators 32 and 42 and of amplifier 46 are all applied as inputs to a multiplexer 48. The analog output of multiplexer 48 is converted to digital data of proportional magnitude by an analog-to-digital (A/D) converter 50 and the digital data is transmitted via infrared signals from an infrared transmitter 52 to a remote computer 57 via a remote receiver 53. The mouse 10 also includes an infrared signal receiver 54 for receiving infrared control signals from a remote transmitter 55 controlled by the computer 57. The receiver 54 utilizes a control signal received from the computer 57 to control the switching state of multiplexer 48.

When the mouse 10 accelerates, the integrators 32, 42 and 44 integrate the outputs of accelerometers 16, 14, and 18 to produce output signals representative of the velocity of the mouse in the directions sensed by the accelerometers. Amplifier 46 produces an output signal proportional to the difference between the velocity signal outputs of integrators 42 and 44 and this output signal is proportional to the angular velocity of the mouse about the vertical axis through point 28 of FIG. 1. The remote computer 57 periodically switches multiplexer 48 via receiver 54 so that the translational velocity indicating output signals of integrators 36 and 42 and the angular velocity indicating output signal of amplifier 46 are successively digitized and periodically transmitted to the computer 57. The computer then utilizes a software integration routine to integrate the translational and angular velocity data to determine the translational displacement of the cross-hair 30 of the mouse 10 of FIG. 1.

The output of "set position" pushbutton 20 is applied as another input to transmitter 52 to control the state of an additional bit of data transmitted to the computer 57 with the output of A/D converter 50 and this bit provides an indicating signal to the computer for marking the position of the mouse. For instance, when an operator wants to mark the position of an endpoint of a line, he places the cross-hair over the point and presses the set pushbutton. "Relocate" pushbutton 22 of FIG. 1 provides an input to an OR gate 56 and the output of the OR gate is the reset signal controlling the switching state of switch 40 of integrator 32 and of similar switches in integrators 42 and 44. When the operator depresses relocate pushbutton 22, the output of OR gate 56 is driven high, causing switch 40 to close. When switch 40 closes, the output of integrator 32 is driven to zero regardless of the magnitude of the output of accelerometer 16. The operator depresses pushbutton 22 in order to relocate the mouse without changing the computer's perception of the apparent location of the mouse in order to adjust the relation between mouse and cursor positions.

When the mouse 10 is not moving, the output signal magnitude of accelerometer 14 is substantially zero but will have some small value due to small calibration inaccuracies and due to the movement of the earth. This small accelerometer output is amplified by preamplifier 35 which typically will add a small offset error to its output due the nature of the internal circuitry in the preamplifier. The output of preamplifier 35 will thus have a small error component when the mouse is not moving which can eventually produce a large effect on the output of integrator 32, since the integrator 32 would continue to integrate the small output of amplifier 35 and the output signal magnitude of integrators 32 would gradually increase. Consequently if switch 40 of each integrator circuit is left open while the mouse is at rest, the computer 57 will perceive the mouse to be slowly moving. Therefore it is beneficial to determine when the mouse is at rest and to periodically assert the reset signal to close switches 40 in the integrators to zero their outputs.

The computer 57 can determine when the mouse is at rest by monitoring the frequency of oscillation of the magnitude of the velocity data output of A/D converter 50. Involuntary tremors in human muscles occur at frequencies ranging from about 10–40 Hertz, and when a human holds the mouse the output signal of the accelerometers will contain a small 10–40 Hertz frequency component. This component is reflected in the oscillations of the data output of A/D converter 50 and the computer can detect oscillations in this range using well known methods. When the frequency component is absent, the computer does not integrate the input data from the mouse and periodically transmits a reset control signal to receiver 54 causing it transmit a signal to an input of an AND gate 62. The output of the AND gate is applied as an input to OR gate 58 which produces the reset signal for zeroing the integrator outputs.

To ensure that the computer does not reset the integrator outputs on lack of tremor when the mouse is actually being moved, a second input to AND gate 62 is driven high only when mouse velocity in any direction is less than a predetermined minimum for a given time period. A/D converter 50 has 8 bit resolution, and assuming the output produced by amplifier 35 is relatively small when the mouse is at rest, the upward drift from zero of the output of integrator 32 due to an inherent offset in its input would affect the states of only one or two of the lower order bits of the converter output during a period of time of 1 millisecond. The upper six output bits of A/D converter 50 are combined by an OR gate 58 and the output of the OR gate is monitored by a timer 60, and if the output of OR gate 58 remains low for 1 millisecond, timer 60 produces an output pulse. This pulse drives another input of AND gate 62, the output of which drives an input of an OR gate 56. The output of OR gate 56 controls the state of switch 40 of integrator 32 and similar switches in integrators 42 and 44. When the mouse is at rest, receiver 54 sends a high input signal to AND gate 62, and when timer 60 produces an output pulse, the output of OR gate 56 is driven high, momentarily closing switch 40 to zero the output of integrator 32. Therefore, when the mouse is at rest, the output of integrator 32 is periodically zeroed as are the outputs of integrators 42 and 44.

The detection of the 10–40 Hertz frequency component in the output signal of the accelerometers may also be performed utilizing hardware mounted within the chassis. The output signals of accelerometers 14, 16, and 18 are summed by a summing circuit 61 and the output of the summing circuit is filtered by a 10–40 Hz bandpass filter 64, rectified by a diode 66, filtered once more by another filter 68 and then applied to an inverting input of a differential amplifier 69. The output of filter 68 is a DC voltage proportional to a time average magnitude of the 10–40 Hz frequency component in the accelerometer output signals. The output of summing circuit 61 is also filtered by a 60 Hz high pass filter 63, rectified by a diode 65, and filtered once more by a filter 67 to provide a DC voltage proportional to the noise component in the accelerometer output signals. This DC voltage output signal is applied to a noninverting input of differential amplifier 69. The output of differential amplifier 69, representing the difference between the magnitude of the 10–40 Hz component and other components in the output of the accelerometers, provides another input to multiplexer 48. Multiplexer 48 periodically applies the output signal of amplifier 69 to A/D converter 50 so that the signal is digitized and transmitted to computer 57 via transmitter 52. When the magnitude of this data is above a predetermined level, the computer determines that the mouse is at rest, ignores incoming velocity data and periodically transmits a reset signal to receiver 54 causing it to close switches 40 via gates 62 and 56.

In the preferred embodiment of the inertial mouse, the first stage of integration of the outputs of the accelerometers is performed by analog integrating circuits within mouse 10 while the second stage of integration is performed by the computer utilizing a software integration routine. However in other embodiments of the invention, the second stage of integration could be performed by additional analog integrating circuits connected in series with integrating circuits 32, 44 and 46. In such embodiment the data transmitted to the computer would represent translational and angular displacement rather than velocity.

Figure 5:
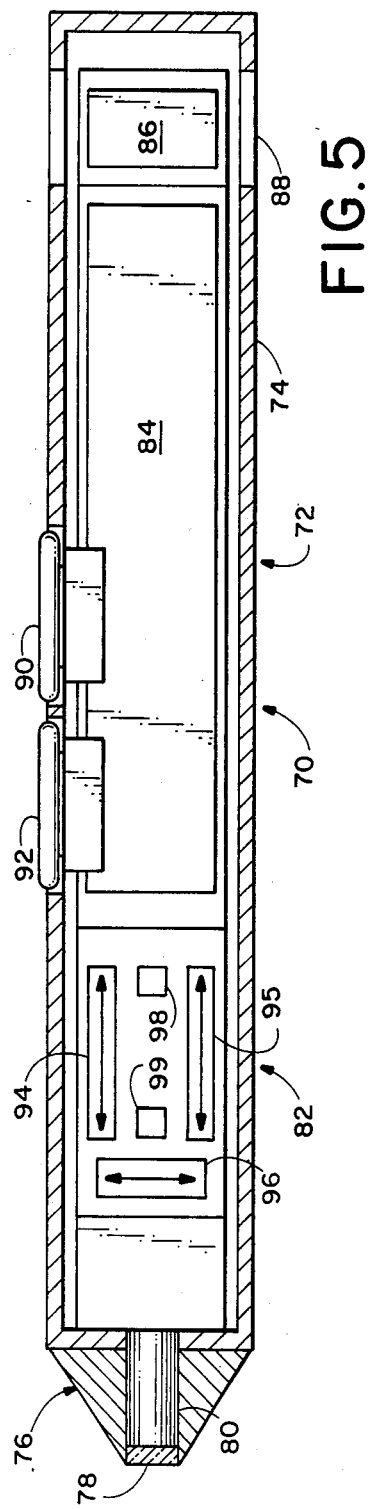
FIG. 5 is a sectional view of an alternative embodiment of an inertial mouse according to the present invention.

The inertial mouse 10 of FIGS. 1–4 enables a user to provide two-dimensional coordinate data into a computer. FIG. 5 is a sectional view of an alternative embodiment of an inertial mouse 70 according to present invention which enables a user to input three-dimensional coordinate data into a computer. Mouse 70 is particularly suited for use in conjunction with computer systems adapted to provide "three-dimensional" graphics displays. In one such system an electronic polarizing shutter is placed in front of a conventional cathode ray tube (CRT) display screen, the shutter being adapted to polarize the light from the screen in either of two mutually perpendicular directions depending on the state of an externally generated control signal. Two two-dimensional views of a three-dimensional object, each view representing a slightly different perspective of the object, are alternately displayed on the screen. The state of the shutter control signal is changed with the views so that the two images are polarized in different directions. A viewer wearing polarized glasses, with one lens polarized to block one of the images and the other lens polarized to block the other image, sees a slightly different perspective of the three-dimensional object with each eye and this gives the viewer a highly realistic impression of a display of a three-dimensional object. Mouse 70 may be used, for instance, in controlling the position of a cursor in the three-dimensional display.

Mouse 70 includes a chassis 72 having substantially the shape of a common ball point pen, including a tubular shaft section 74 terminated by a conical tip 76. The tip 76 includes a transparent plastic portion 78 for permitting light to enter into the tip and to strike a photocell 80 mounted within the tip. A set of six accelerometers 82 (five are visible in FIG. 4) are mounted within tubular section 74 of the chassis 72 near tip 76. Electronic signal processing circuitry 84 is mounted within a central portion of tubular chassis section 74 and an infrared transmitter/receiver section 86, adapted for communicating with a remote computer through a transparent section 88 of chassis 72, is mounted within the end of chassis 72 opposite the tip 76. A pair of pushbutton switches 90 and 92 are installed on the side of chassis 72.

The accelerometers 82 are positioned to detect translational and rotational accelerations in and about any of three mutually perpendicular axes. A suitable physical arrangement of accelerometers 82 with respect to three axes (X, Y and Z) is illustrated in FIG. 6. The Z axis is parallel with the axis of tubular section 74 of mouse 70. The X and Y axes are perpendicular to the Z axis, with the X axis perpendicular to the plane of view of FIG. 5 and the Y axis parallel to the plane of view of FIG. 4. The six accelerometers 82 are positioned within mouse 70 to detect accelerations in the directions indicated by the bold double arrows of FIG. 6. A pair of accelerometers 94 and 95 are positioned to detect translational accelerations in the Z direction, and a difference in the outputs of accelerometers 94 and 95 is proportional to the angular acceleration of the mouse about the X axis. Similarly a second pair of accelerometers 96 and 97 detect translational acceleration of the mouse in the Y direction and angular acceleration about the Z axis, and a third pair of accelerometers 98 and 99 detect translational acceleration in the X direction and angular acceleration about the Y axis.

Referring to FIG. 7, depicting in block diagram form the signal processing circuitry 84 and the transmitter/receiver 86 sections of the mouse 70, the outputs of accelerometers 94–99 are integrated by integrators 106–111 respectively. Integrators 106–111 are similar to integrator 32 of FIG. 5. The outputs of integrators 106 and 107 drive noninverting and inverting inputs of a differential amplifier 118, the outputs of integrators 108 and 109 drive noninverting and inverting inputs of a second differential amplifier 120, and the outputs of integrators 110 and 111 drive noninverting and inverting inputs of a third differential amplifier 120. The outputs of integrators 106, 108 and 110 which are proportional to the velocity of mouse 70 in the Z, Y and X directions, respectively, and the outputs of amplifiers 118, 120 and 122, which are proportional to the angular velocity of mouse 70 about the X, Z and Y directions, respectively, are applied as inputs to a multiplexer 124.

The output of multiplexer 124 is converted to proportional digital quantity by an A/D converter 126 and then transmitted to a remote computer 136 via an infrared transmitter 128 and receiver 138. Set pushbutton 90 also provides an input to transmitter 128, and the mouse operator depresses the pushbutton to transmit an indicating signal to the remote computer. An infrared receiver 130 receives control signals from computer 136 by way of a transmitter 140 and decodes these signals to provide an output signal for controlling the switching state of multiplexer 124.

The remote computer 136 integrates the velocity indicating data transmitted by transmitter 128 and uses the results to determine changes in position of the tip 76 of the mouse 70. The output of A/D converter 126 is also monitored by an integrator reset circuit 132 similar to the combination in FIG. 4 of OR gate 58, timer 60, AND gate 62, and OR gate 56. The output of reset circuit 132 controls the state of switches within the integrators to zero the output of the integrators when the mouse is not moving. Receiver 130 and pushbutton switch 92 provide additional inputs to reset circuit 132, the receiver input indicating when the remote computer 136 detects the presence of the 10–40 Hz tremor in the output of transmitter 128 and the pushbutton switch 92 indicating when the user wishes to move the mouse without changing the remote computer's impression of its apparent position.

The photocell 80 of FIG. 7 drives a detector circuit 134 which produces a single bit output signal when the photocell detects a minimum light level. The output signal of detector circuit 134 is transmitted by transmitter 128 to the remote computer 136. The photocell 80 may be utilized to synchronize the tip 76 of the mouse 70 to the position of a mouse on the screen of a three-dimensional display system. When a user taps the tip on the screen, the accelerometers 82 indicate a rapid deceleration of the mouse which is noted by the remote computer. The computer 136 then monitors the output of the photocell (via photodetector 134 and transmitter 128) and makes note of when the photocell produces an output pulse indicating that the phosphors on the screen under the mouse tip have just been struck by the electron beam. Since the computer 136 knows the position of the electron beam at any time, it can determine the position on screen of the mouse tip from the timing of the photocell output pulse. The computer then repositions a cursor on the screen so that it appears to coincide with the tip of the mouse. Thereafter the computer monitors the position of the mouse tip, as indicated by the twice integrated accelerometer outputs, and moves the apparent position of the cursor in three-dimensional space as the mouse tip moves away from the screen, so that the cursor position always coincides with the mouse tip. This enables an operator to directly control the position of a curser in a three-dimensional display, a feature which is useful for instance, in conjunction with a three-dimensional graphics program permitting the operator to make free hand three-dimensional drawings.

While accelerometer 16 of FIG. 1 is oriented to detect acceleration in a direction perpendicular to the direction of acceleration detected by accelerometers 14 and 18, it is necessary only that accelerometer 16 be oriented in a direction non-parallel to that of accelerometers 14 and 18. I.e., it is desired only that accelerometers 14 and 16 are aligned along the axes of a two-dimensional horizontal cartesian coordinate system. Similarly, with reference to FIG. 6, while the accelerometers 94–99 of the three-dimensional version of the mouse are preferably aligned along the axes of a rectilinear coordinate system, such accelerometers may be aligned in a similar fashion along the axes of any cartesian coordinate system and still provide enough information to indicate the translational acceleration of the mouse in any direction in three-dimensional space and its rotational acceleration about any axis in three-dimensional space.

The inertial mouse of the present invention thus provides a convenient means for a user to provide data input to a computer from which the computer can ascertain two or three-dimensional coordinates corresponding to the position of the mouse. The inertial mouse is particularly useful for providing user input to interactive, two and three-dimensional graphics displays.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An apparatus for providing data to a computer from which the computer can determine an operator selected spatial position with respect to a reference point corresponding to a location on a display, the apparatus comprising:
   a chassis adapted to be held in an operator's hand;
   an accelerometer mounted on the chassis for producing an output signal of magnitude proportional to the acceleration of the chassis as the operator moves the chassis from a reference point;
   means for integrating the accelerometer output signal to produce velocity data of magnitude proportional to the velocity of said chassis; and
   means for providing said velocity data to a computer so that the computer can integrate the velocity data to determine the magnitude of the displacement of the chassis from the reference point, the displacement of the chassis being indicative of its spatial position with respect to the reference point.

2. The apparatus according to claim 1 further comprising means for transmitting an operator initiated indicating signal to said computer so that the operator can indicate to said computer when the operator has moved the chassis to a selected spatial position.

3. The apparatus according to claim 1 further comprising:
   switch means mounted on said chassis, said switch means being operable by said operator; and
   means for transmitting an indicating signal to said computer when said operator operates said switch means.

4. An apparatus for providing data to a computerized graphics system, said data representing an operator selected spatial position with respect to a reference point corresponding to an operator viewable display, the apparatus comprising:
   a chassis adapted to be held in an operator's hand;
   an accelerometer mounted on the chassis for producing an output signal of magnitude proportional to the acceleration of the chassis when the operator moves the chassis from a reference point; and
   means for twice integrating the accelerometer output signal to determine the displacement of said chassis from the reference point and for providing data representative of said displacement to said computerized graphics system.

5. An inertial mouse system for permitting an operator to provide data to a computer graphics system indicating an operator selected spatial position with respect to a reference point, the inertial mouse system comprising:
   a chassis adapted to be held in an operator's hand;
   means responsive to operator input for transmitting an indicating signal to the computer when the operator has moved the chassis from a reference point to said operator selected spatial position;
   an accelerometer mounted on said chassis for producing an accelerometer output signal of magnitude proportional to the acceleration of the chassis;
   an integrator circuit mounted on said chassis for integrating the accelerometer output signal to produce a velocity signal;
   an analog-to-digital converter for periodically converting the velocity signal to digital data thereby producing a sequence of digital data; and
   means for integrating the magnitude of said sequence of digital data produced by said analog-to-digital converter to produce displacement data proportional to the displacement of the chassis from the reference point.

6. An apparatus for permitting an operator to provide input data to a computer from which the computer can determine an operator selected spatial position, said apparatus comprising:
   a chassis adapted to be held in an operator's hand;
   means for asserting a reset signal when the operator is not moving the chassis;
   an accelerometer mounted on said chassis for producing an accelerometer output signal of magnitude proportional to the acceleration of the chassis when the operator moves the chassis from a reference point;
   an integrator circuit mounted on said chassis, responsive to said reset signal, for integrating the accelerometer output signal to produce an integrator circuit output signal proportional to the velocity of the chassis, said integrator circuit including means for setting said integrator output signal to zero magnitude upon assertion of said reset signal;
   an analog-to-digital converter for periodically converting the integrator circuit output signal to a representative digital quantity thereby producing a sequence of data representing the velocity of said chassis; and
   means for transmitting said sequence of data to said computer, said computer integrating said sequence of data to determine the displacement of said chassis from said reference point.

7. The apparatus according to claim 6 wherein said means for asserting a reset signal comprises:
   frequency detection means for indicating when said accelerometer output signal oscillates with a frequency component within a predetermined range of frequency components; and
   means for causing said reset signal to be periodically asserted when said frequency detection means indicates that said accelerometer output signal does not oscillate with a frequency component within said predetermined range.

8. The apparatus according to claim 6 further comprising a manually operable switch mounted on said chassis, said reset signal being asserted when said operator operates said switch.

9. An apparatus for permitting an operator to provide input data to a computer from which the computer can determine an operator selected spatial position with respect to a reference point, said apparatus comprising:

a chassis adapted to be held in an operator's hand;

a plurality of accelerometers positioned on said chassis for producing output signals of magnitudes proportional to the translational acceleration of the chassis in a plurality of non-parallel directions when the operator moves the chassis from a reference point;

means for twice integrating the output signals of said accelerometers to produce displacement velocity indicating data indicating the displacement of said chassis from said reference point; and means for providing said displacement indicating data to a computer.

10. The apparatus according to claim 9 further comprising:

light detecting means mounted on said chassis for detecting light of a minimum intensity; and means responsive to said light detecting means for transmitting to said computer a light detection indicating signal when said light detecting means detects light of said minimum intensity.

11. An apparatus for permitting an operator to provide input data to a computer from which the computer can determine an operator selected spatial position with respect to a reference point, said apparatus comprising:

a chassis adapted to be held in an operator's hand;

a plurality of accelerometers, each for producing an output signal porportional to an acceleration in one direction, positioned on said chassis such that said each accelerometer produces an output signal of magnitude proportional to the translational acceleration of the chassis in one direction when the operator moves the chassis from a reference point, pairs of said accelerometers being oriented for detecting accelerations along each of the axis of a three-dimensional cartesian coordinate system such that an angular acceleration of the chassis about an axis of rotation in any direction causes a difference between the magnitudes of the output signals of the accelerometers of at least one of said accelerometer pairs;

means for integrating the output signal of each of said accelerometers to produce translational velocity indicating signals of magnitude proportional to the velocity of said chassis in a plurality of directions;

means for differencing the integrated output signals of the accelerometers of said pairs of accelerometers to produce angular velocity indicating signals of magnitude proportional to the angular velocity of the chassis; and means responsive to said translational and angular velocity indicating signals for transmitting to said computer data of magnitude proportional to said translational and angular velocity indicating signals.

* * * * *